United States Patent
Ogura et al.

(10) Patent No.: US 12,036,862 B2
(45) Date of Patent: Jul. 16, 2024

(54) INFORMATION PROCESSING DEVICE, INFORMATION PROCESSING SYSTEM, INFORMATION PROCESSING METHOD, AND TERMINAL DEVICE

(71) Applicant: TOYOTA JIDOSHA KABUSHIKI KAISHA, Toyota (JP)

(72) Inventors: Yui Ogura, Nagoya (JP); Takayuki Oidemizu, Nagakute (JP); Yoh Ikeda, Konan (JP); Tatsuya Suzuki, Nagoya (JP); Shingo Taguchi, Nagoya (JP); Tsunehiro Yokomori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 414 days.

(21) Appl. No.: 17/580,982

(22) Filed: Jan. 21, 2022

(65) Prior Publication Data

US 2022/0324326 A1 Oct. 13, 2022

(30) Foreign Application Priority Data

Apr. 7, 2021 (JP) ................... 2021-065510

(51) Int. Cl.
*B60K 35/00* (2024.01)
*G06Q 10/02* (2012.01)
(Continued)

(52) U.S. Cl.
CPC ............ *B60K 35/00* (2013.01); *G06Q 10/02* (2013.01); *G06Q 50/40* (2024.01); *G08G 1/202* (2013.01); *B60K 35/28* (2024.01); *B60K 35/60* (2024.01); *B60K 35/80* (2024.01); *B60K 2360/176* (2024.01); *B60K 2360/31* (2024.01); *B60K 2360/563* (2024.01); *B60K 2360/785* (2024.01)

(58) Field of Classification Search
CPC ........ B60K 35/00; B60K 35/28; B60K 35/60; B60K 35/80; B60K 2360/176; B60K 2360/31; B60K 2360/563; B60K 2360/785; B60K 2360/592; B60K 35/85; B60K 2360/177; G06Q 10/02; G06Q 50/40; G08G 1/202; G08G 1/005; G08G 1/20; G06T 19/00; B60R 1/00
See application file for complete search history.

(56) References Cited

U.S. PATENT DOCUMENTS

2023/0003535 A1* 1/2023 Miyahara ........... G01C 21/3438

FOREIGN PATENT DOCUMENTS

| JP | 2002-032897 A | 1/2002 |
| JP | 2004-185362 A | 7/2004 |
| JP | 2019-121049 A | 7/2019 |

* cited by examiner

*Primary Examiner* — Rodney A Butler
(74) *Attorney, Agent, or Firm* — Oliff PLC

(57) ABSTRACT

An information processing device includes an interface configured to acquire position information of a vehicle which picks up a user and a user surrounding image which is obtained by imaging surroundings of the user using a terminal device carried by the user and a control unit configured to generate user surrounding data including data on an object present near the user based on the user surrounding image. The control unit is configured to generate an image based on the assumption that the user is seen from the vehicle as a virtual user image based on the position information of the vehicle and the user surrounding data and to output the virtual user image to the vehicle.

20 Claims, 5 Drawing Sheets

(51) Int. Cl.
    *G06Q 50/40*     (2024.01)
    *G08G 1/00*     (2006.01)
    *B60K 35/28*     (2024.01)
    *B60K 35/60*     (2024.01)
    *B60K 35/80*     (2024.01)

INFORMATION PROCESSING DEVICE, INFORMATION PROCESSING SYSTEM, INFORMATION PROCESSING METHOD, AND TERMINAL DEVICE

CROSS-REFERENCE TO RELATED APPLICATION

This application claims priority to Japanese Patent Application No. 2021-065510 filed on Apr. 7, 2021, incorporated herein by reference in its entirety.

BACKGROUND

1. Technical Field

The present disclosure relates to an information processing device, an information processing system, an information processing method, and a terminal device.

2. Description of Related Art

In the related art, a system that displays an image that a user requesting allocation of a taxi has taken of his or her surroundings on a terminal of an allocated taxi is known (for example, see Japanese Unexamined Patent Application Publication No. 2002-32897 (JP 2002-32897 A)).

SUMMARY

A driver of a vehicle cannot easily recognize a user who waits for the vehicle by merely seeing an image that the user has taken of his or her surroundings. There is demand for provision of information enabling a driver to easily find a user.

The present disclosure provides a system that can enable a driver of a vehicle to easily find a user waiting for the vehicle.

An information processing device according to an embodiment of the present disclosure includes an interface and a control unit. The interface is configured to acquire position information of a vehicle which picks up a user and a user surrounding image which is obtained by imaging surroundings of the user using a terminal device carried by the user. The control unit is configured to generate user surrounding data including data on an object present near the user based on the user surrounding image. The control unit is configured to generate an image based on the assumption that the user is seen from the vehicle as a virtual user image based on the position information of the vehicle and the user surrounding data and to output the virtual user image to the vehicle.

An information processing system according to an embodiment of the present disclosure includes the information processing device and the terminal device.

An information processing method according to an embodiment of the present disclosure includes: acquiring position information of a vehicle which picks up a user and a user surrounding image which is obtained by imaging surroundings of the user using a terminal device carried by the user. The information processing method includes generating user surrounding data including data on an object present near the user based on the user surrounding image. The information processing method includes generating an image based on the assumption that the user is seen from the vehicle as a virtual user image based on the position information of the vehicle and the user surrounding data. The information processing method includes outputting the virtual user image to the vehicle.

A terminal device according to an embodiment of the present disclosure is carried by a user. The terminal device includes: an input unit configured to receive an input for requesting riding in a vehicle from the user; an imaging unit; and a terminal control unit configured to generate request information based on the input for requesting riding in the vehicle received by the input unit. The terminal control unit is configured to output the request information to an information processing device. The terminal control unit is configured to generate a user surrounding image by causing the imaging unit to image surroundings of the user when a vehicle is allocated to the user by the information processing device. The terminal control unit is configured to output the user surrounding image to the information processing device such that the information processing device is able to generate an image based on the assumption that the user is seen from the vehicle as a virtual user image based on the user surrounding image and to output the generated virtual user image to the vehicle.

With the information processing device, the information processing system, the information processing method, and the terminal device according to the embodiments of the present disclosure, a driver of a vehicle can easily find a user waiting for the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Example of Configuration of Information Processing System 1

Figure 1:
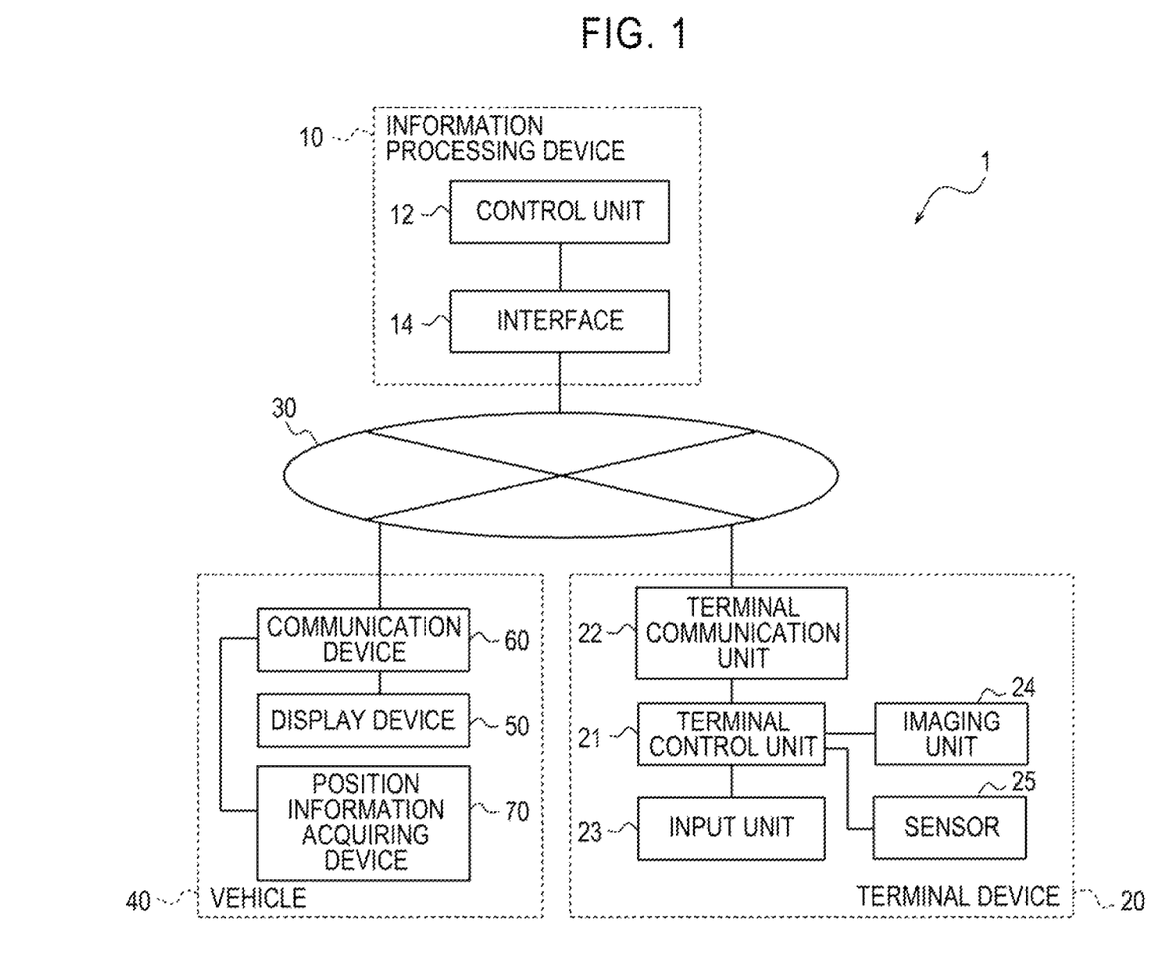
FIG. 1 is a block diagram illustrating an example of a configuration of an information processing system according to an embodiment.

As illustrated in FIG. 1, an information processing system 1 according to an embodiment includes an information processing device 10, a terminal device 20, and a display device 50. The terminal device 20 is carried by a user. The display device 50 is mounted in a vehicle 40 and displays an image which is seen by a driver of the vehicle 40.

The information processing system 1 provides a vehicle allocation service of receiving a request for riding in a vehicle 40 from a user and allocating the vehicle 40 to the user. When the request from the user is received, the vehicle 40 moves to a place in which the user waits and allows the user to get in the vehicle 40. A driver of the vehicle 40 visually finds the user and allows the user to get in the vehicle 40. In order for the driver to easily find the user, the information processing system 1 generates an image with a view based on the assumption that the place in which the user is waiting for the vehicle 40 is seen by the driver through a front windshield and causes the display device 50 to display the generated. The driver can easily ascertain the place in which the user is waiting by comparing the displayed image with an actual view. Constituent units of the information processing system 1 will be described below.

Information Processing Device 10

The information processing device 10 includes a control unit 12 and an interface 14.

The control unit 12 controls constituent units of the information processing device 10. The control unit 12 may include one or more processors. In this embodiment, a "processor" is a general-purpose processor, a dedicated processor for a specific process, or the like, but the present disclosure is not limited thereto. The control unit 12 may include one or more dedicated circuits. The dedicated circuit may include, for example, a field-programmable gate array (FPGA) or an application-specific integrated circuit (ASIC). The control unit 12 may include a dedicated circuit instead of the processor or may include a dedicated circuit in addition to the processor.

The information processing device 10 may further include a storage unit. The storage unit is, for example, a semiconductor memory, a magnetic memory, or an optical memory, but is not limited thereto. The storage unit may serve as, for example, a main storage device, an auxiliary storage device, or a cache storage device. The storage unit may include an electromagnetic storage medium such as a magnetic disk. The storage unit may include a non-transitory computer-readable medium. The storage unit stores arbitrary information which is used for an operation of the information processing device 10. For example, the storage unit may store a system program or an application program. The storage unit may be included in the control unit 12.

The interface 14 outputs information, data, or the like from the control unit 12 or inputs information, data, or the like to the control unit 12. The interface 14 is also referred to with the abbreviation "I/F."

The interface 14 may include a communication module that is configured to communicate with another device such as the terminal device 20 via a network 30. For example, the communication module may support a mobile communication standard such as 4th Generation (4G) or 5th Generation (5G). The communication module may support a communication standard such as a local area network (LAN) standard. The communication module may support a wired or wireless communication standard. The communication module is not limited thereto and may support various communication standards. The interface 14 may be configured to be able to be connected to the communication module.

The information processing device 10 may include a single server device or a plurality of server devices capable of communicating with each other.

Terminal Device 20

Figure 3:
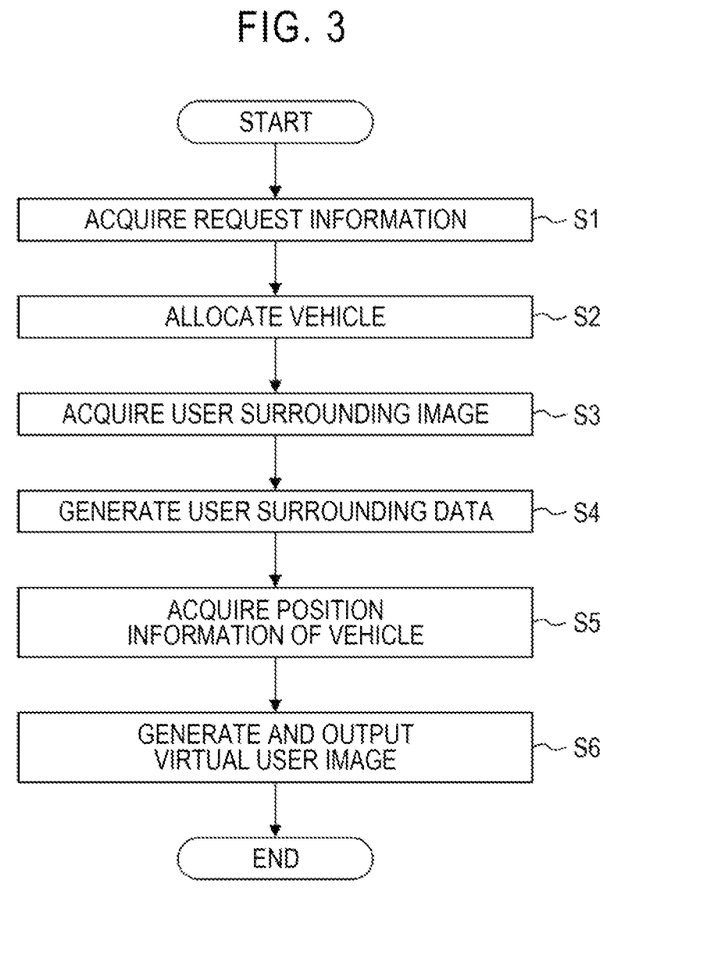
FIG. 3 is flowchart illustrating an example of a routine of an information processing method according to the embodiment.

As illustrated in FIG. 3, the terminal device 20 includes a terminal control unit 21, a terminal communication unit 22, an input unit 23, and an imaging unit 24.

The terminal control unit 21 controls constituent units of the terminal device 20. The terminal control unit 21 may be configured identically or similarly to the control unit 12 of the information processing device 10. The terminal control unit 21 may include one or more processors. The terminal control unit 21 may include one or more dedicated circuits. The dedicated circuit may include, for example, an FPGA or an ASIC. The terminal control unit 21 may include a dedicated circuit instead of the processor or may include a dedicated circuit in addition to the processor.

The terminal device 20 may further include a storage unit. The storage unit of the terminal device 20 may be configured identically or similarly to the storage unit of the information processing device 10. The storage unit is, for example, a semiconductor memory, a magnetic memory, or an optical memory, but is not limited thereto. The storage unit may serve as, for example, a main storage device, an auxiliary storage device, or a cache storage device. The storage unit may include an electromagnetic storage medium such as a magnetic disk. The storage unit stores arbitrary information which is used for an operation of the terminal device 20. For example, the storage unit may store a system program or an application program. The storage unit may be included in the terminal control unit 21.

The terminal communication unit 22 transmits information, data, or the like output from the terminal control unit 21 to the information processing device 10. The terminal communication unit 22 may include a communication module that is configured to communicate with another device such as the information processing device 10 via the network 30. For example, the communication module may include a communication module that supports a mobile communication standard such as 4G or 5G, but is not limited thereto.

The input unit 23 may include an input device that receives an input of information, data, or the like from a user. The input device may include, for example, a touch panel, a touch sensor, or a pointing device such as a mouse. The input device may include physical keys. The input device may include a voice input device such as a microphone.

The imaging unit 24 may include, for example, a camera or an imaging device. The imaging unit 24 images the surroundings of the user and outputs a captured image as a user surrounding image.

The terminal device 20 may further include a sensor 25. The sensor 25 may include, for example, a motion sensor that detects a motion or a posture of the terminal device 20.

The number of terminal devices 20 included in the information processing system 1 is not limited to one and may be two or more. The terminal device 20 may include a mobile terminal such as a smartphone or a tablet or a personal computer (PC) such as a notebook PC or a tablet PC. The terminal device 20 is not limited thereto and may include various devices.

Vehicle 40

The vehicle 40 has a display device 50, a communication device 60, and a position information acquiring device 70 mounted therein.

The communication device 60 may be configured as an onboard communication device. The communication device 60 may include a communication module that is configured to communicate with another device such as the information processing device 10 via the network 30. For example, the communication module may include a communication module that supports a mobile communication standard such as 4G or 5G, but is not limited thereto.

The position information acquiring device 70 acquires position information of the vehicle 40. The position information acquiring device 70 may include a receiver that supports a satellite positioning system. The receiver supporting a satellite positioning system may include, for example, a Global Positioning System (GPS) receiver.

The display device 50 may include, for example, a display device that outputs visual information such as an image, text, or a figure. The display device may include, for example, a liquid crystal display (LCD), an organic electroluminescence (EL) display, an inorganic EL display, or a plasma display panel (PDP). The display device is not limited thereto and may include various types of displays. The display device may include a light emitting device such as a light emission diode (LED) or a laser diode (LD). The display device may include various types of devices.

The display device 50 may be included in an onboard device which is mounted in the vehicle 40. For example, the display device 50 may be included in a car navigation device that provides a navigation function of the vehicle 40.

Operation Example of Information Processing System 1

The information processing system 1 according to this embodiment receives a request for riding in a vehicle 40 from a user and allocates the vehicle 40 to the user. The information processing system 1 acquires an image obtained by imaging surroundings of the user from a terminal device 20 of the user. The image obtained by imaging surroundings of the user is also referred to as a user surrounding image. The information processing system 1 generates user surrounding data in which an object present near the user is mapped based on the user surrounding image. The information processing system 1 acquires position information of the vehicle 40 allocated to the user. The information processing system 1 generates an image based on a view of a driver when the driver is assumed to see the user from the vehicle 40 based on the position information of the vehicle 40 and the user surrounding data. The image based on the view of the driver when the driver is assumed to see the user from the vehicle 40 is also referred to as a virtual user image. The information processing system 1 outputs the virtual user image to the vehicle 40 and allows the driver to see the virtual user image. The driver can easily find a place in which the user is waiting for the vehicle 40 by referring to the virtual user image to move the vehicle 40 to the place in which the user is waiting for the vehicle 40. An example of an operation of causing the information processing device 10 and the terminal device 20 of the information processing system 1 to provide a virtual user image to a driver will be described below.

Allocation of Vehicle 40 to User

The terminal control unit 21 of the terminal device 20 receives an input from the user using the input unit 23. The user can request riding in the vehicle 40 using the input unit 23. The terminal control unit 21 outputs information of the user's request for riding in the vehicle 40 from the terminal communication unit 22 to the information processing device 10. The information of the user's request for riding in the vehicle 40 is also referred to as request information.

The interface 14 of the information processing device 10 acquires request information from the terminal device 20. The control unit 12 of the information processing device 10 allocates the vehicle 40 in which the user can ride to the user based on the request information.

Allocation of the vehicle 40 to the user in the information processing system 1 is not limited to the aforementioned example, but may be realized in various aspects.

Generation of Information of which Driver of Vehicle 40 is Notified

When the vehicle 40 is allocated to the user, the control unit 12 generates information required for the vehicle 40 to pick up the user, outputs the generated information to the vehicle 40, and notifies the driver of the vehicle 40 of the information. The information required for picking up the user is also referred to as pickup information. The pickup information includes information on a position at which the user is waiting for the vehicle 40. The position at which the user is waiting for the vehicle 40 is also referred to as a waiting position. Information on the position at which the user is waiting for the vehicle 40 is also referred to as waiting position information. The pickup information may include information on a time at which the user desires to ride in the vehicle 40. The driver moves the vehicle 40 to the place in which the user is waiting for the vehicle 40 based on the pickup information and finds and picks up the user.

The information on the place in which the user is waiting for the vehicle 40 may include, for example, rough information such as the vicinity of station X or the vicinity of village Y. Even when position information of the user detected by the terminal device 20 carried by the user is output, accuracy of the position information may be low. When the driver is not accurately aware of the place in which the user is waiting for the vehicle 40, the driver visually finds and picks up the user. However, when the driver does not know what the user looks like, when the driver loses the user in a crowd of people, or the like, the driver may have difficulty finding the user even if the vehicle 40 approaches the place in which the user is waiting for the vehicle 40. In the information processing system 1 according to this embodiment, the control unit 12 generates an image based on the assumption that the driver sees the place in which the user is waiting for the vehicle 40 from the vehicle 40 and allows the display device 50 mounted in the vehicle 40 to display the image to the driver such that the driver can easily find the user. The image based on the assumption that the driver sees the place in which the user is waiting for the vehicle 40 from the vehicle 40 is also referred to as a virtual user image. An operation of the control unit 12 that generates the virtual user image in the information processing system 1 according to this embodiment will be described below.

User Surrounding Image

The imaging unit 24 of the terminal device 20 captures an image of the surroundings of a user who carries the terminal device 20. Specifically, the terminal control unit 21 of the terminal device 20 may control the imaging unit 24 such that the image of the surroundings of the user is captured. The terminal control unit 21 may instruct the user to capture the image of the surroundings of the user and cause the user to capture the image of the surroundings of the user through the user's operation. For example, the terminal control unit 21 may guide the user's operation such that the user can capture the image of the surroundings of the user using a user interface of the terminal device 20. The image of the surroundings of the user is also referred to as a user surrounding image.

The terminal device 20 may cause the user to perform an operation such that the imaging unit 24 captures an image in at least one direction from the user as the user surrounding image. The terminal device 20 may cause the user to perform an operation such that the imaging unit 24 captures images in a plurality of directions from the user as the user surrounding image. For example, the terminal device 20 may cause the user to perform an operation such that the imaging unit 24 captures images in four directions of north, south, east, and west from the user. The terminal device 20 may cause the user to perform an operation such that the imaging unit 24 captures images in 360 degrees around the user. Specifically, the terminal device 20 may instruct the user to turn 360 degrees at his or her position while instructing the user to hold the terminal device 20 in a predetermined posture such that the imaging unit 24 captures an image in 360 degrees. In the information processing system 1, as will be described later, a virtual user image is generated based on the user surrounding image. As the imaging unit 24 captures images in more directions as the user surrounding image, accuracy of the virtual user image which is generated based on the user surrounding image can be enhanced. As a result, the driver can more easily find the user.

User Surrounding Data

The interface 14 of the information processing device 10 acquires the user surrounding image from the terminal device 20. The control unit 12 of the information processing device 10 generates user surrounding data associated with an object present near the user based on the user surrounding image. The user surrounding data may include a position and a shape of an object present near the user. The control unit 12 may generate the user surrounding data, for example, as will be described below.

The control unit 12 detects an object present near the user from the user surrounding image. The control unit 12 may detect a fixed object such as a road, a sign, a signboard, or a building as an object present near the user. The control unit 12 may detect a moving object such as a vehicle, a motorbike, or a bicycle as an object present near the user. The control unit 12 may detect a person other than the user as an object present near the user.

The control unit 12 identifies a position of the detected object. The control unit 12 identifies the position of the object by identifying a direction in which the object is seen by the user and a distance from the user to the object. The control unit 12 can identify the direction of the object based on the direction in which the user surrounding image is captured. When the user surrounding image includes distance information, the control unit 12 can calculate the distance from the user to the object based on the distance information. Even when the user surrounding image does not include distance information, the control unit 12 may estimate distance information of an object appearing in the user surrounding image using a predetermined algorithm and estimate the distance from the user to the object based on the estimated distance information.

The control unit 12 may identify an appearance of the detected object. The control unit 12 may detect pixels of the user surrounding image as a part of the object and identify the object as a set of pixels.

The control unit 12 disposes the detected object in a virtual space corresponding to a space including the waiting position of the user. When the detected object is identified as a set of pixels, the control unit 12 may dispose the pixels as voxels in the virtual space.

As described above, the control unit 12 can generate data in which an object present near the user is disposed in a virtual space as the user surrounding data. The control unit 12 may generate various types of data with which an object present near the user can be identified as the user surrounding data.

Virtual User Image

The interface 14 acquires position information of the vehicle 40. The control unit 12 generates a virtual user image based on the position information of the vehicle 40 and the user surrounding data. The user surrounding data is generated based on the user surrounding image. Accordingly, the control unit 12 can be said to generate the virtual user image based on the position information of the vehicle 40 and the user surrounding image. The control unit 12 may generate the virtual user image, for example, as will be described below.

The control unit 12 roughly calculates a direction of the waiting position of the user from the vehicle 40 based on waiting position information and the position information of the vehicle 40. The control unit 12 can generate a virtual view in which the virtual space identified by the user surrounding data is seen in a direction from the vehicle 40 to the waiting position of the user as an image. Specifically, the control unit 12 can generate a virtual user image by disposing an object in the image based on coordinate data of the object in the virtual space and a direction from a viewpoint with the position of the vehicle 40 as the viewpoint. The control unit 12 is not limited to the aforementioned example, and may generate the virtual user image based on various rendering techniques.

The control unit 12 outputs the generated virtual user image to the display device 50 mounted in the vehicle 40. The display device 50 displays the virtual user image and allows the driver to see the virtual user image. The driver can easily find the user by comparing the virtual user image with a view over the front windshield.

Figure 2:
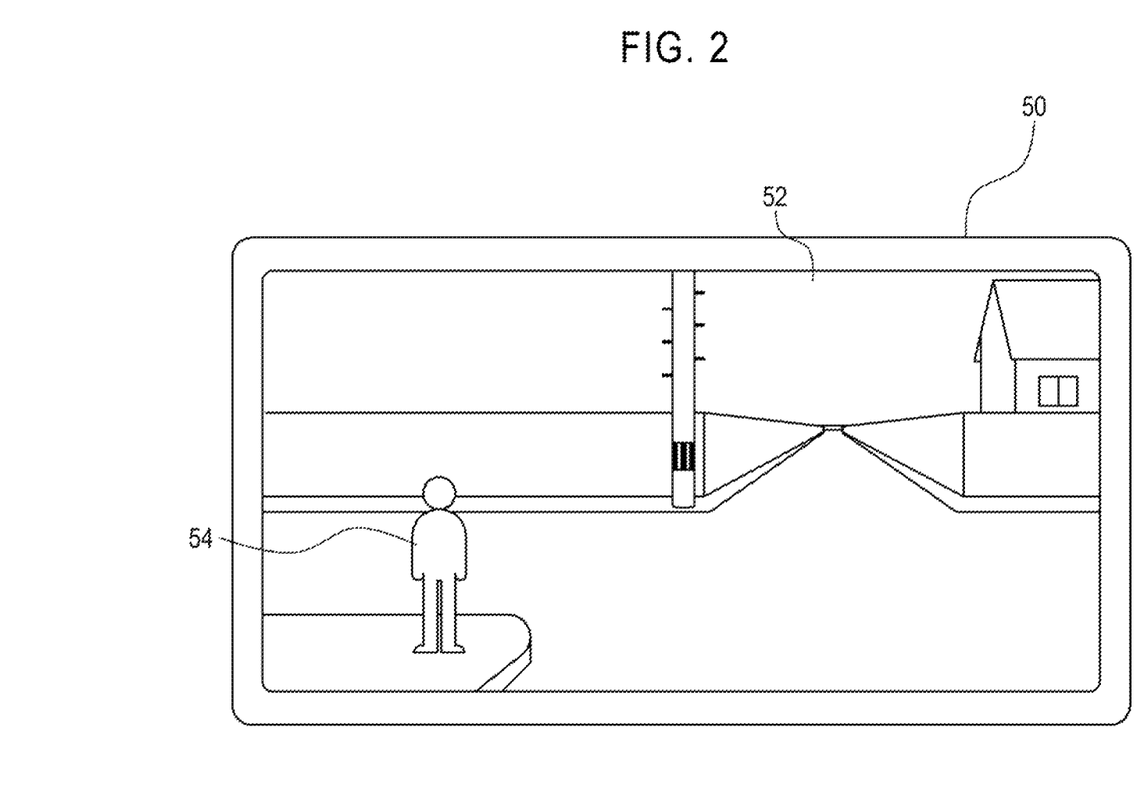
FIG. 2 is a diagram illustrating an example of a display device that displays a virtual user image.

As illustrated in FIG. 2, the display device 50 may display the virtual user image as a display image 52. The control unit 12 may display the position at which the user is waiting for the vehicle 40 as a virtual indication 54 of the user in the virtual user image. Accordingly, the driver can easily find the user. The control unit 12 may display the virtual indication 54 of the user as a silhouette as illustrated in FIG. 2 or may display the virtual indication 54 of the user in another aspect such as an avatar.

The control unit 12 may generate a virtual user image in which the waiting position of the user is seen from the current position of the vehicle 40. By generating the virtual user image from a viewpoint of the current position of the vehicle 40, the driver can easily understand whether she or he is approaching the waiting position of the user. The control unit 12 may generate a virtual user image based on the assumption that the vehicle 40 has arrived within a predetermined range from the waiting position of the user. The control unit 12 may generate a virtual user image based on the assumption that the vehicle 40 has arrived at a specific position. By generating the virtual user image based on the assumed position of the vehicle 40, it is possible to both decrease a calculation load of the control unit 12 for generating the virtual user image and make it easier for the driver to find the user.

Example of Routine of Information Processing Method

As described above, in the information processing system 1 according to this embodiment, the information processing device 10 receives a request for riding on a vehicle 40 from a user, allocates a vehicle 40 on which the user rides to the user, generates pickup information of the user, and outputs the pickup information to the vehicle 40. For example, the control unit 12 of the information processing device 10 may perform an information processing method including the routine of the flowchart illustrated in FIG. 3. The information processing method may be realized as an information processing program that is executed by the control unit 12. The information processing program may be stored in a non-transitory computer-readable medium.

The control unit 12 acquires request information for riding in a vehicle 40 from a terminal device 20 (Step S1). The control unit 12 allocates a vehicle 40 to the user (Step S2). The control unit 12 acquires a user surrounding image from the terminal device 20 (Step S3). The control unit 12 generates user surrounding data based on the user surrounding image (Step S4). The control unit 12 acquires position information of the vehicle 40 (Step S5). The control unit 12 generates a virtual user image based on the position information of the vehicle 40 and the user surrounding data and outputs the virtual user image to the display device 50 mounted in the vehicle 40 (Step S6). The control unit 12 ends the routine of the flowchart illustrated in FIG. 3 after having performed the process of Step S6. The control unit 12 may repeatedly perform the processes of Steps S5 and S6 and generate the virtual user image again with movement of the vehicle 40.

Example of Routine of Terminal Control Method

Figure 4:
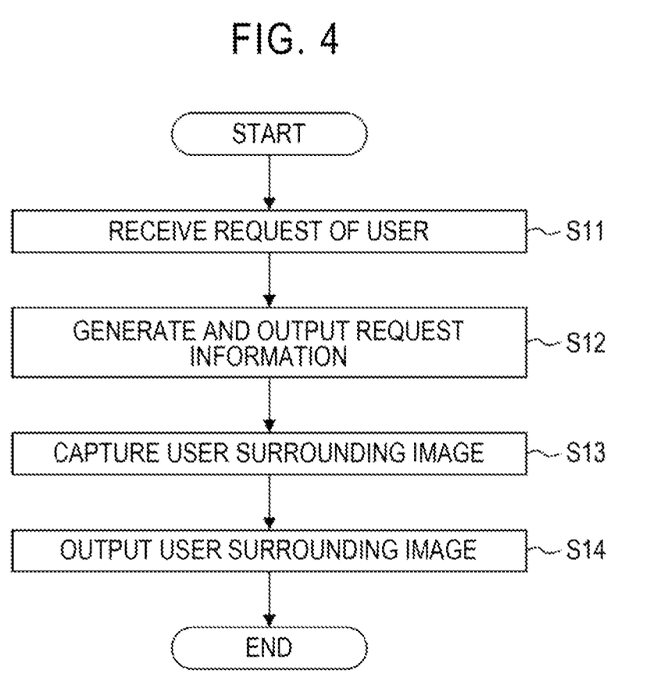
FIG. 4 is flowchart illustrating an example of a routine of a terminal control method according to the embodiment.

The terminal device 20 receives an input of a request from a user, captures a user surrounding image when a vehicle 40 is allocated to the user, and outputs the captured user surrounding image to the information processing device 10. For example, the terminal control unit 21 of the terminal device 20 may perform a terminal control method including the routine of the flowchart illustrated in FIG. 4. The terminal control method may be realized as a terminal control program that is executed by the terminal control unit 21. The terminal control program may be stored in a non-transitory computer-readable medium.

The terminal control unit 21 receives an input of a request for riding in a vehicle 40 from a user using the input unit 23 (Step S11). The terminal control unit 21 generates request information and outputs the generated request information to the information processing device 10 (Step S12). When a vehicle 40 is allocated to the user by the information processing device 10, the terminal control unit 21 captures a user surrounding image using the imaging unit 24 (Step S13). The terminal control unit 21 outputs the user surrounding image to the information processing device 10 such that the information processing device 10 can generate an image based on the assumption that the user is seen from the vehicle 40 based on the user surrounding image as a virtual user image, and outputs the user surrounding image to the vehicle 40 (Step S14). The terminal control unit 21 ends the routine of the flowchart illustrated in FIG. 4 after having performed the process of Step S14.

Summary

As described above, the information processing system 1 according to this embodiment can generate a virtual user image based on the assumption that a user waiting for arrival of a vehicle 40 allocated to the user is seen from the vehicle 40 and enable a driver of the vehicle 40 to see the virtual user image. Accordingly, the driver of the vehicle 40 can easily find the user when the user is picked up.

The information processing system 1 according to this embodiment can enable the driver of the vehicle 40 to easily find the user without causing the user to send information of the user to the information processing device 10. For example, since a user does not need to send a face image of the user or detailed position information of the user as information of the user, it is possible to realize consideration of protection of privacy of the user and easy finding of the user by the driver. Since the information processing device 10 acquires information of the user, the driver can more easily find the user.

Another Embodiment

An example of a configuration of an information processing system 1 according to another embodiment will be described below.

Generation of Position Information of User Based on User Surrounding Image

A terminal device 20 may capture images in at least three directions from a user as a user surrounding image. The interface 14 of the information processing device 10 may acquire the images obtained by imaging the surroundings of the user in at least three directions as the user surrounding image. The control unit 12 of the information processing device 10 may generate user position information for identifying a position of the user based on the user surrounding image obtained by imaging the surroundings of the user in at least three directions. Specifically, the control unit 12 detects an object from the images obtained by imaging the surroundings of the user in each direction. The control unit 12 identifies a position of at least one object out of the detected objects. The control unit 12 may identify, for example, the position of the object as information of latitude and longitude. The control unit 12 calculates a distance from the user to the object. The control unit 12 can identify the position of the user and generate user position information based on the position of the object detected in each of the at least three directions from the user and the distance from the user to the object. As described above, the control unit 12 can generate user position information for identifying the position of the user based on the user surrounding images obtained by imaging the surroundings of the user in at least three directions.

The control unit 12 may detect a predetermined landmark appearing in the user surrounding image. The predetermined landmark may include a building with a distinct appearance. The control unit 12 may calculate a distance to the predetermined landmark based on an outer size of the predetermined landmark and the size of the landmark appearing in the user surrounding image. By causing the control unit 12 to detect the predetermined landmark, it is possible to enhance accuracy of the user position information. As a result, the driver can easily find the user.

The control unit 12 may acquire position information of the terminal device 20 using the interface 14 and generate the user position information additionally based on the position information of the terminal device 20. Accordingly, it is possible to enhance accuracy of the user position information. As a result, the driver can easily find the user.

Complementation of User Surrounding Data

The control unit 12 may acquire complementary data for complementing the user surrounding data and generate the user surrounding data additionally based on the complementary data. The complementary data may include, for example, map data associated with positions of roads, buildings, or the like near the user. For example, the interface 14 may acquire map data from an external device as the complementary data. The control unit 12 may generate user surrounding data by complementing the user surrounding data based on the positions of roads, buildings, or the like identified by the map data. The control unit 12 may detect a reference position common to the user surrounding data and the map data and complement the user surrounding data with the map data such that the reference position overlaps. Since the user surrounding data can be complemented, it is possible to enhance accuracy of the user surrounding data. As a result, the driver can easily find the user.

The control unit 12 may detect a reference position common to the user surrounding data and the complementary data based on position information of the user. Accordingly, it is possible to enhance accuracy of the user surrounding data. As a result, the driver can easily find the user.

The control unit 12 may correct the position information of the user by comparing the user surrounding data with the complementary data. Accordingly, it is possible to enhance accuracy of the user position information. As a result, the driver can easily find the user.

Use of Vehicle Surrounding Image

A vehicle 40 may include a camera that images surroundings of the vehicle 40. An image obtained by imaging the surroundings of the vehicle 40 using the camera is also referred to as a vehicle surrounding image. The vehicle 40 may capture a vehicle surrounding image using the camera and output the captured vehicle surrounding image to the information processing device 10. The control unit 12 of the information processing device 10 may acquire the vehicle surrounding image using the interface 14. The control unit 12 may extract an image based on the assumption that the waiting position of the user is seen from the vehicle 40 from the vehicle surrounding image based on the user position information and correct the virtual user image based on the extracted image. That is, the control unit 12 may generate the virtual user image additionally based on the vehicle surrounding image and the user position information in addition to the user surrounding data. Since the virtual user image is generated additionally based on the vehicle surrounding image, it is possible to enhance accuracy of the virtual user image. As a result, the driver can easily find the user.

Aspect of Virtual Indication 54 of User

The control unit 12 may acquire information on a user state from the terminal device 20. The user state may include information on a posture of the user such as whether the user stands up or sits. In this case, the terminal device 20 may detect the posture of the user using the sensor 25 and output the information on the posture of the user. The user state may include information on the user's motion such as whether the user stands still at the waiting position or is moving in the vicinity of the waiting position. In this case, the terminal device 20 may detect the user's motion using the sensor 25 and output information on the user's motion. The user state may include information on an appearance of the user such as a body height and a body width of the user. In this case, the terminal device 20 may output information on the appearance of the user based on information of the user registered in advance by the user.

The control unit 12 may determine an aspect of the virtual indication 54 of the user which is added to the virtual user image based on the information on the user state. The control unit 12 may determine the virtual indication 54 as a silhouette or an avatar indicating that the user stands up when the user stands up, and determine the virtual indication 54 as a silhouette or an avatar indicating that the user sits when the user sits. The control unit 12 may determine the size of the silhouette or avatar displayed as the virtual indication 54 based on the appearance of the user. Since the virtual indication 54 is determined based on the user state, the driver can easily find the user.

Aspect in which Information Processing Device 10 is Mounted in Vehicle 40

Figure 5:
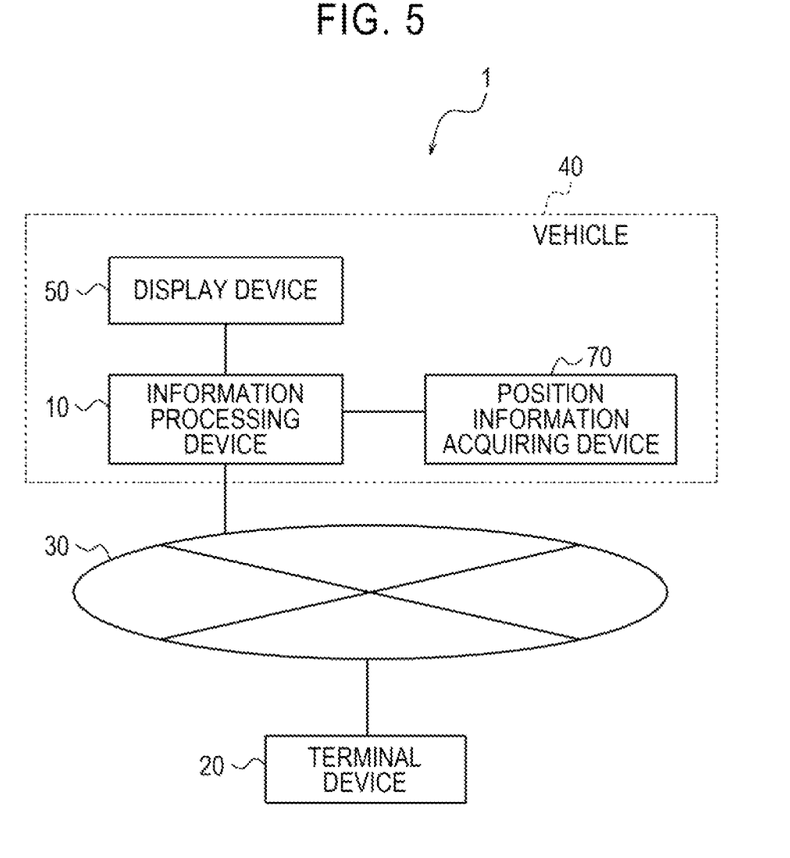
FIG. 5 is a block diagram illustrating an example of a configuration of an information processing system according to another embodiment.

As illustrated in FIG. 5, the information processing device 10 may be mounted in a vehicle 40. For example, an onboard device of the vehicle 40 may realize the function of the information processing device 10. When the information processing device 10 is mounted in the vehicle 40, the information processing device 10 may output a virtual user image to the display device 50 or control the display device 50. The information processing device 10 may acquire position information of the vehicle 40 from the position information acquiring device 70.

When the information processing device 10 is mounted in a vehicle 40, the information processing device 10 may acquire request information or a user surrounding image from a terminal device 20 via the network 30. The information processing device 10 may acquire the request information or the user surrounding image from the terminal device 20 via another server device.

User Picked Up by Vehicle 40

In the information processing system 1, the vehicle 40 may include an estate car or a microbus for picking up a customer reserved for various stores such as a restaurant and a beauty shop. In this case, a user may include a reserved customer waiting for meeting from a store. The information processing device 10 may receive a reservation for use of a store from a user and receive a request for pickup. The information processing device 10 may receive a reservation for use of a store or a request for pickup from a user or provide a function of the reservation system of the store in cooperation with a reservation system of the store.

While embodiments of the present disclosure have described above with reference to the drawings and examples, it should be noted that the present disclosure can be modified and altered in various forms by those skilled in the art. Accordingly, it should be noted that the modifications and alterations are included in the scope of the present disclosure. For example, the functions included in the units or steps can be rearranged unless logical conflictions arise and a plurality of units or steps may be combined into a single unit or step or a single unit or step may be divided.

What is claimed is:

1. An information processing device comprising:
an interface configured to acquire position information of a vehicle which picks up a user and a user surrounding image which is obtained by imaging surroundings of the user using a terminal device carried by the user; and
a control unit configured to generate user surrounding data including data on an object present near the user based on the user surrounding image,
wherein the control unit is configured to generate an image based on the assumption that the user is seen from the vehicle as a virtual user image based on the position information of the vehicle and the user surrounding data and to output the virtual user image to the vehicle.

2. The information processing device according to claim 1, wherein the control unit is configured to generate user position information for identifying a position of the user based on the user surrounding data.

3. The information processing device according to claim 2, wherein the interface is configured to acquire images obtained by imaging the surroundings of the user in at least three directions as the user surrounding image, and
wherein the control unit is configured to generate the user position information based on the user surrounding data which is generated based on the images obtained by imaging the surroundings of the user in at least three directions.

4. The information processing device according to claim 2, wherein the control unit is configured to generate the user position information additionally based on a result of detection of a predetermined landmark appearing in the user surrounding image.

5. The information processing device according to claim 2, wherein the control unit is configured to generate the user position information additionally based on position information of the terminal device.

6. The information processing device according to claim 2, wherein the interface is configured to acquire a vehicle surrounding image captured by the vehicle, and
wherein the control unit is configured to generate the virtual user image additionally based on the vehicle surrounding image and the user position information.

7. The information processing device according to claim 1, wherein the interface is configured to acquire complementary data for complementing the user surrounding data, and
wherein the control unit is configured to generate the user surrounding data additionally based on the complementary data.

8. The information processing device according to claim 1, wherein the interface is configured to acquire images obtained by imaging the surroundings of the user in 360 degrees as the user surrounding image.

9. The information processing device according to claim 1, wherein the control unit is configured to add a virtual indication of the user to the virtual user image.

10. The information processing device according to claim 9, wherein the interface is configured to acquire information on a state of the user from the terminal device, and
wherein the control unit is configured to generate the virtual indication of the user based on the information on the state of the user.

11. The information processing device according to claim 1, wherein the interface is configured to acquire request information for the user to request riding in a vehicle from the terminal device, and
wherein the control unit is configured to allocate a vehicle to the user based on the request information.

12. An information processing system comprising:
the information processing device according to claim 1; and
the terminal device.

13. An information processing method comprising:
acquiring position information of a vehicle which picks up a user and a user surrounding image which is obtained by imaging surroundings of the user using a terminal device carried by the user;
generating user surrounding data including data on an object present near the user based on the user surrounding image;
generating an image based on the assumption that the user is seen from the vehicle as a virtual user image based on the position information of the vehicle and the user surrounding data; and
outputting the virtual user image to the vehicle.

14. The information processing method according to claim 13, further comprising generating user position information for identifying a position of the user based on the user surrounding data.

15. The information processing method according to claim 13, further comprising:
acquiring complementary data for complementing the user surrounding data; and
generating the user surrounding data additionally based on the complementary data.

16. The information processing method according to claim 13, further comprising adding a virtual indication of the user to the virtual user image.

17. A terminal device that is carried by a user, the terminal device comprising:
an input unit configured to receive an input for requesting riding in a vehicle from the user;
an imaging unit; and
a terminal control unit configured to generate request information based on the input for requesting riding in a vehicle received by the input unit,
wherein the terminal control unit is configured to:
output the request information to an information processing device;
generate a user surrounding image by causing the imaging unit to image surroundings of the user when a vehicle is allocated to the user by the information processing device; and
output the user surrounding image to the information processing device such that the information processing device is able to generate an image based on the assumption that the user is seen from the vehicle as a virtual user image based on the user surrounding image and to output the generated virtual user image to the vehicle.

18. The terminal device according to claim 17, wherein the terminal control unit is configured to generate the user surrounding image by causing the imaging unit to image the surroundings of the user in at least three directions.

19. The terminal device according to claim 17, wherein the terminal control unit is configured to generate the user surrounding image by causing the imaging unit to image the surroundings of the user in 360 degrees.

20. The terminal device according to claim 17, further comprising a sensor configured to detect a state of the user, wherein the terminal control unit is configured to output information on the state of the user detected by the sensor to the information processing device such that the information processing device adds a virtual indication of the user to the virtual user image based on the information on the state of the user.

* * * * *